United States Patent [19]

Pohl

[11] Patent Number: 4,653,285
[45] Date of Patent: Mar. 31, 1987

[54] SELF-CALIBRATING CONTROL METHODS AND SYSTEMS FOR REFRIGERATION SYSTEMS

[75] Inventor: Walter J. Pohl, Louisville, Ky.

[73] Assignee: General Electric Company, Louisville, Ky.

[21] Appl. No.: 778,076

[22] Filed: Sep. 20, 1985

[51] Int. Cl.$^4$ ............. F25B 49/00; H02H 7/00
[52] U.S. Cl. .................. 62/126; 62/154; 62/158; 62/230; 361/22; 361/29; 361/33
[58] Field of Search ............... 62/234, 230, 154, 155, 62/228.1, 126, 127, 128, 129, 140, 158; 361/22, 23, 28, 29, 31, 33; 318/782

[56] References Cited

U.S. PATENT DOCUMENTS

| | | | |
|---|---|---|---|
| 3,671,830 | 6/1972 | Kruper | 318/221 |
| 4,038,061 | 7/1977 | Anderson et al. | 62/126 |
| 4,079,432 | 3/1978 | Godfrey | 361/23 |
| 4,102,391 | 7/1978 | Noland et al. | 165/29 |
| 4,104,888 | 8/1978 | Reedy et al. | 62/154 X |
| 4,123,792 | 10/1978 | Gephart et al. | 307/126 |
| 4,176,396 | 11/1979 | Howatt | 364/551 |
| 4,196,462 | 4/1980 | Pohl | 361/33 |
| 4,197,532 | 4/1980 | Lawson, II | 340/648 |
| 4,215,554 | 8/1980 | Pohl | 62/156 |
| 4,240,072 | 12/1980 | Fowler | 340/664 |
| 4,251,872 | 2/1981 | Bone | 364/551 |
| 4,253,130 | 2/1981 | Newell | 361/22 |
| 4,286,303 | 8/1981 | Genheimer et al. | 361/24 |
| 4,299,095 | 11/1981 | Cassarino | 62/155 |
| 4,474,024 | 10/1984 | Eplett et al. | 62/140 |

Primary Examiner—Harry Tanner
Attorney, Agent, or Firm—H. Neil Houser; Radford M. Reams

[57] ABSTRACT

Disclosed are refrigeration system control systems and methods for compressor motor protection and defrost control. The disclosed systems and methods are generic in the sense that they are self-calibrating and so may be employed in a variety of different air conditioner or heat pump models of different sizes and capacities, without being specifically tailored for a particular model. The disclosed systems and methods sense loading on the compressor and evaporator fan motors, preferably by sensing the voltage across the capacitor-run winding of an AC induction motor and normalizing with respect to line voltage. The self-calibrating capability is implemented by taking advantage of the changing loads as a function of time on both the compressor and fan motors during both normal and abnormal operation of a refrigeration system. In overview, a reference value of motor loading is established for each motor at certain times during an ON cycle. At later times the then-prevailing motor loading is compared to the stored reference in order to provide a basis for control decisions. The ratio of capacitor-run winding voltage to line voltage is an advantageous indicator of motor loading. In one embodiment, a reference ratio of capacitor-run winding voltage to line voltage is established, and at later times is compared to the then-prevailing ratio of capacitor-run winding voltage to line voltage.

40 Claims, 10 Drawing Figures

SELF-CALIBRATING CONTROL METHODS AND SYSTEMS FOR REFRIGERATION SYSTEMS

BACKGROUND OF THE INVENTION

The present invention relates to control systems and methods for refrigeration systems, including air conditioners and heat pumps, which control systems avoid the need for expensive sensors and which are capable of functioning in a variety of refrigeration system models, without adjustment or selection. In this regard, the control methods and systems of the present invention may be termed "generic" in that a single control system is capable of serving a large number of different models, of widely differing capacities.

The present invention is particularly concerned with refrigeration systems of the type employed in air conditioners and heat pumps for cooling and heating living spaces. Such units are available in a wide variety of physical configurations and capacities, including small room air conditioners, self-contained reversible heat pump systems which somewhat resemble room air conditioners, but which provide both heating and cooling, central air conditioning systems which employ an indoor evaporator and a separate outdoor compressor/condenser combination, and similarly-configured heat pump systems which provide both heating and cooling by means of a reversible refrigeration system.

Such refrigeration systems, while apparently simple to control, in fact require fairly sophisticated control systems if proper operation and protection from damage under a wide variety of operating conditions, often adverse, are to be achieved. In addition, both heat pumps and air conditioners require periodic defrosting of the evaporator. For highest efficiency, defrosting should be done only when necessary.

Typical prior art control systems for protecting refrigeration systems employ a number of sensors so that the control system is provided with sufficient information upon which to base control decisions. For example, a common operating condition to which refrigeration systems are subjected is so-called "short cycling" which results when an attempt is made to restart the refrigerant compressor shortly after it has been running and before pressures within the closed circuit refrigeration system have had time to equalize. This condition typically results following a momentary power interruption, or as a result of user adjustment of a thermostatic control in a manner which causes the compressor to attempt a restart right after it has stopped. The compressor is unable to start under load, and hence stalls. Thus, typical control systems sense the overcurrent condition which results when the compressor motor is stalled, and de-energize the compressor motor for a cooling off period if the over current condition persists for more than a few seconds. Thermal overload protectors provide similar results.

A related adverse condition is simply a high load condition, which can result when power line voltage is excessively low (a so-called "brown out" condition), or when operating under extreme ambient temperature conditions. Thus, on an extremely hot day, an air conditioning system may be subjected to both a high load and low voltage. This tends to make the motor inefficient, which leads to over heating. Under such operating conditions, it is desirable to de-energize the compressor before damage results, and then allow operation to resume after a cooling-off interval.

Other compressor protection systems employ pressure sensors connected into the high-pressure side of the refrigeration system in order to sense excessive pressures, and de-energize the compressor when these occur.

By way of more specific example, various motor and compressor protection systems are disclosed in the following U.S. Pat. Nos. 4,038,061 to Anderson et al; Godfrey 4,079,432; Newell 4,253,130; and Genheimer et al 4,286,303. Of these, Anderson and Newell disclose relatively comprehensive systems for protecting air conditioners and heat pumps, and employ a variety of current and temperature sensors. Godfrey and Genheimer et al disclose motor protection systems in general which include the function of allowing a motor to attempt a restart following an overload, but only for a limited number of times.

Another approach to motor protection, particularly for a refrigeration system compressor motor, is disclosed in commonly-assigned Pohl U.S. Pat. No. 4,196,462. As disclosed in that patent, a single-phase AC induction motor of the type employing a capacitor-run winding can be protected from overload and overspeed conditions by monitoring the voltage across the capacitor-run winding. Under heavy loading conditions, the winding voltage decreases. This can be sensed, and used to initiate appropriate protection measures, such as a timed cooling-off interval. The system described in U.S. Pat. No. 4,196,462 also inherently recognizes a locked-rotor condition.

Defrost control systems typically employ from one to three temperature sensors in order to recognize particular conditions characteristic of excessive evaporator frost, and to initiate a defrosting operation when this occurs. Examples of such systems are disclosed in commonly-assigned Nolan et al U.S. Pat. No. 4,102,391 and commonly-assigned Pohl U.S. Pat. No. 4,215,554.

Another approach to detecting excessive ice formation on an evaporator, particularly the outdoor heat exchanger of a heat pump system, is disclosed in Gephart et al U.S. Pat. No. 4,123,792. Gephart et al recognize that ice buildup changes the loading on the evaporator fan motor. The degree of motor loading is monitored and detected by developing a signal proportional to the average product of motor current multiplied by the cosine of the phase angle between motor current and motor voltage.

In a related approach, Fowler U.S. Pat. No. 4,420,072 discloses a load indicator for a blower motor which circulates air through an air filter. When the filter becomes dirty, this condition is recognized by a change in motor loading.

From the foregoing brief background, it will be appreciated that prior art control systems not only require a relatively large number of diverse sensors, but also must be particularly adjusted to the size of the unit involved. Thus, overcurrent protection sized for a small air conditioner would be entirely inappropriate for a large one. By way of example, a typical product line may have from twenty to thirty different models, each requiring a customized control system.

SUMMARY OF THE INVENTION

It is an object of the invention to provide refrigeration system control systems and methods which are generic in the sense that they are self-calibrating and so may be employed in a variety of different air conditioner or heat pump models without being specifically tailored for a particular model, or even a particular individual unit.

It is another object of the invention to provide such control systems and methods which avoid the need for a variety of specialized sensors.

It is another object of the invention to provide such systems and methods which are applicable to compressor motor protection as well as to defrost control.

In accordance with one overall aspect of the invention, it is recognized that sensed motor loading, however sensed, may advantageously be employed for a variety of protection and control purposes by control systems which are self-calibrating. In accordance with the invention, sensing motor loading at various times provides sufficient information on which to base control decisions for a number of functions including, but not limited to, overload protection, defrosting and protection against short cycling.

Motor RPM is a convenient indicator of motor loading, and an excellent indicator of motor stress. Rather than directly sensing motor RPM, it is recognized that a form of the sensing system of the above-identified commonly-assigned Pohl U.S. Pat. No. 4,196,462 can be employed to great advantage. More particularly, where a refrigeration system employs single-phase AC induction motors of the type including a "run" winding and a separate capacitor-run winding to provide a "split" phase, during operation of such a motor the ratio of voltage across the capacitor-run winding to line voltage provides a sensitive indicator of motor operating conditions.

It will be appreciated that, in accordance with the broader aspects of the invention, other techniques for sensing motor loading may be employed. By way of example and not limitation, the motor loading sensing techniques of Gephart et al U.S. Pat. No. 4,123,782 and Fowler U.S. Pat. No. 4,240,072 can each be adapted to the self-calibrating control and protection techniques of the present invention.

A particularly significant aspect of the invention is its self-calibrating capability which takes advantage of the changing nature as a function of time of the load on both the compressor and fan motors during both normal and abnormal operation of a refrigeration system. Thus, in overview, in accordance with the invention, reference values of motor loading (in an exemplary embodiment as reflected by the ratio of capacitor-run winding voltage to line voltage) are established at certain times during an ON cycle. At later times the then-prevailing motor loadings (or the then-prevailing ratios of capacitor-run winding voltage to line voltage) are compared to the stored references in order to provide a basis for control decisions.

In general, in refrigeration systems, adverse conditions such as compressor overheating or excessive frost develop only after a considerable time has elapsed from the beginning of a run. For example, frost takes at least an hour to build to an undesirable level, causing excessive pressures and temperatures in the system. Motor temperatures rise slowly, causing increased copper losses and adverse stresses reflected in performance output.

More particularly, in accordance with the invention, protection for a motor driving a refrigerant compressor in a refrigeration system which is cycled ON and OFF during operation is provided as follows. Following the start of a compressor ON cycle, a stabilization interval is allowed to elapse during which start-up transients, liquid slugging effects, and the like have dissipated, but before the compressor is significantly loaded as a result of pressure build up. The duration of the stabilization interval is in the range of five seconds to five minutes. A typical stabilization interval is thirty seconds. After the stabilization interval has elapsed, a compressor motor reference loading is determined by sensing the motor loading at that particular time and storing it as a reference loading. In the preferred form of the invention where voltage ratios are sensed, the ratio of capacitor-run winding to line voltage is sensed after the stabilization interval has elapsed, and stored as a compressor motor reference ratio. This approach is effective because the ratio of capacitor-run winding to line voltage is largely independent of normal line voltage fluctuations.

Thereafter, during each compressor ON cycle, motor loading is at least periodically sensed, and compared to the stored reference. If the then-prevailing loading has increased above a high load threshold loading established as a predetermined function of the reference loading, then overloading is indicated, and the compressor is de-energized. In the preferred form of the invention, it is the then-prevailing ratio of capacitor-run winding voltage to line voltage which is sensed and compared to the compressor motor reference ratio. The compressor motor is de-energized if the then-prevailing ratio falls below a high-load threshold ratio established as a predetermined fraction of the reference ratio. The high-load threshold ratio is preferably on the order of 0.75–0.80 times the reference ratio.

Significantly, this approach can be made self-calibrating, and compressor motor protection is afforded regardless of the size of the motor, since the motor control system of the invention establishes its own reference based on the characteristics of the particular motor. Moreover, since the voltage-sensing technique of the above-incorporated Pohl U.S. Pat. No. 4,196,462 inherently measures instantaneous motor stress rather than actual heat build-up, the motor can be protected before a temperature rise actually takes place. Thus, a sudden change in load produced by blockage, for example, can be detected, and the motor protected before excessive temperatures are reached. Similarly, if an excessive drop in line voltage occurs with a consequent drop in RPM and a corresponding increase in lost power due to motor inefficiency, the subject control system will anticipate excessive temperatures to provide enhanced motor protection.

In the event the compressor motor has been de-energized as a result of the then-prevailing ratio falling below the high-load threshold ratio, the motor is re-energized after a cooling-off time interval has elapsed. A cooling-off time interval of in the order of ten minutes is typical.

Another form of compressor protection afforded quite advantageously by the present invention is a locked rotor condition caused by the compressor failing to start at all, or stopping during operation due to an extreme overload. In accordance with this aspect of the invention, at the beginning of a compressor ON cycle, a compressor motor equilibrium speed interval, for example two seconds is allowed to elapse, and the then-prevailing ratio of capacitor-run winding voltage to line voltage is sensed. If this ratio is below a predetermined locked rotor ratio, then a locked rotor condition is recognized, and the compressor motor is de-energized. It turns out that the use of one locked rotor ratio is effective for virtually all motors regardless of their rated size. An exemplary locked rotor ratio is 0.5. Thus, if after two seconds, the motor's capacitor-run winding voltage to line voltage is less than 0.5, the locked rotor condition is recognized.

When the locked-rotor condition is recognized, the compressor is de-energized for a cool-down interval of typically 2.5 minutes. Thereafter, the compressor motor is re-energized for a restart attempt. Normally, this condition occurs under "short cycling" conditions, and eventually the refrigeration system pressures approach equilibrium, removing the load from the compressor, which then starts. For the event some other problem is causing the locked rotor condition, the number of restarts is counted and limited to a predetermined number, for example nine, after which the system shuts down entirely.

In accordance with the invention, related self-calibrating techniques are applied to controlling defrosting operations. For most defrost control purposes, loading on the evaporator fan motor is sensed, preferably by sensing the ratio of capacitor-run winding voltage to line voltage. For some defrosting conditions, it is also advantageous to monitor the compressor motor since, in the presence of excessive evaporator frost buildup, the load on the compressor motor is reduced.

More particularly, in accordance with the invention, defrosting of an evaporator in a refrigeration system is controlled by the following self-calibrating technique. When a refrigeration system ON cycle begins, an airflow stabilization interval, on the order of ten seconds is allowed to elapse. During the airflow stabilization interval, evaporator airflow stabilizes at a rate corresponding to an unblocked evaporator. At that time, a fan motor reference loading is determined and stored as a reference. In the preferred embodiments, the ratio of fan motor capacitor-run winding voltage to line voltage is employed as an indicator of fan motor loading. Thus, a fan motor reference ratio is determined by sensing and then storing the ratio of capacitor-run winding voltage to line voltage. As evaporator frost builds up and increasingly blocks airflow, the load on the fan motor decreases because the fan moves less air and therefore does less work. Thus, thereafter, during each ON cycle, prevailing fan motor loading is sensed at least periodically, and compared to the reference loading. A defrosting operation is initiated if sensed loading is less than a low-load threshold loading established as a predetermined function of the reference speed.

In the preferred embodiments of the invention where capacitor-run winding voltage is sensed, the then-prevailing ratio is compared to the reference ratio, and a defrosting operation is initiated if the prevailing ratio exceeds a low-load threshold ratio established as a predetermined fraction in excess of the reference ratio. A low-load threshold ratio of approximately 1.08 times the fan motor reference ratio has been found to be suitable. This will depend to some extent on the type of fan blades used; the figure given is particularly applicable to blower-type air movers.

The precise manner of effecting defrosting depends upon the particular system, and whether it is an air conditioner or a heat pump. For example, an indoor evaporator for an air conditioner can be defrosted by simply de-energizing the refrigeration compressor while allowing the evaporator fan motor to continue to run. In the case of a heat pump in the heating mode when the outside coil is functioning as the evaporator, defrosting can be effected by turning off both the compressor and fan motors. Even at outdoor ambient temperatures down to 25° F., sufficient heat from the refrigeration system normally reaches the evaporator to cause melting of the frost, without the necessity for applying external heat. Other heat pump systems employ reverse cycle defrost wherein the system is in effect placed in a cooling mode to supply heat to the outdoor coil.

In accordance with another aspect of the invention, the conclusion of defrosting of the outdoor evaporator coil of the heat pump is sensed by at least periodically energizing the evaporator fan and checking evaporator fan loading during speed defrosting operation. When the fan speed approaches the reference loading, this indicates that the evaporator is again substantially unblocked. This control function is preferably implemented by sensing the then-prevailing ratio of capacitor-run winding voltage to line voltage and comparing the sensed ratio to the previously-established reference ratio.

In a manner similar to that summarized above for recognizing a locked rotor condition of the compressor motor, failure of the fan motor to start can be detected. For example, failure to start can be caused by a mechanical obstruction blocking the fan blades. In accordance with this aspect of the invention, a fan motor equilibrium speed interval is allowed to elapse. The fan motor equilibrium speed interval is generally within the range of two seconds to ten seconds, and is typically three seconds. At that point, the ratio of capacitor-run winding voltage to line voltage is sensed, and the fan motor is deenergized if this ratio falls below a predetermined locked rotor ratio. As in the case of locked compressor motor protection, a suitable locked rotor ratio is 0.5. In the case of a failure of the fan motor to start, no further restarts are attempted, and the compressor is de-energized also to avoid overheating the system.

In accordance with another aspect of the invention, it is recognized that under some conditions the entire system may inadvertently be reset during a defrosting operation. Such can occur as a result of a momentary power interruption, or as a result of the user turning the unit OFF then ON while a defrosting operation coincidentally happens to be in progress. In accordance with the invention, this condition is sensed by a failure of compressor load to build-up after a compressor loading interval in the order of ten minutes. Thus, in accordance with the invention, a compressor loading interval is allowed to elapse, and compressor motor loading is then sensed. If compressor motor loading is below a normal load threshold loading established as a predetermined function of the reference speed, then a precautionary defrosting operation is initiated.

In the preferred forms of the invention where voltage sensing is employed, a precautionary defrosting operation is initiated if the ratio of capacitor-run winding voltage to line voltage is above a normal load threshold ratio established as a predetermined fraction of the reference ratio. Typically, the predetermined fraction is approximately 0.95 times the reference ratio.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

DETAILED DESCRIPTION

Figure 1:
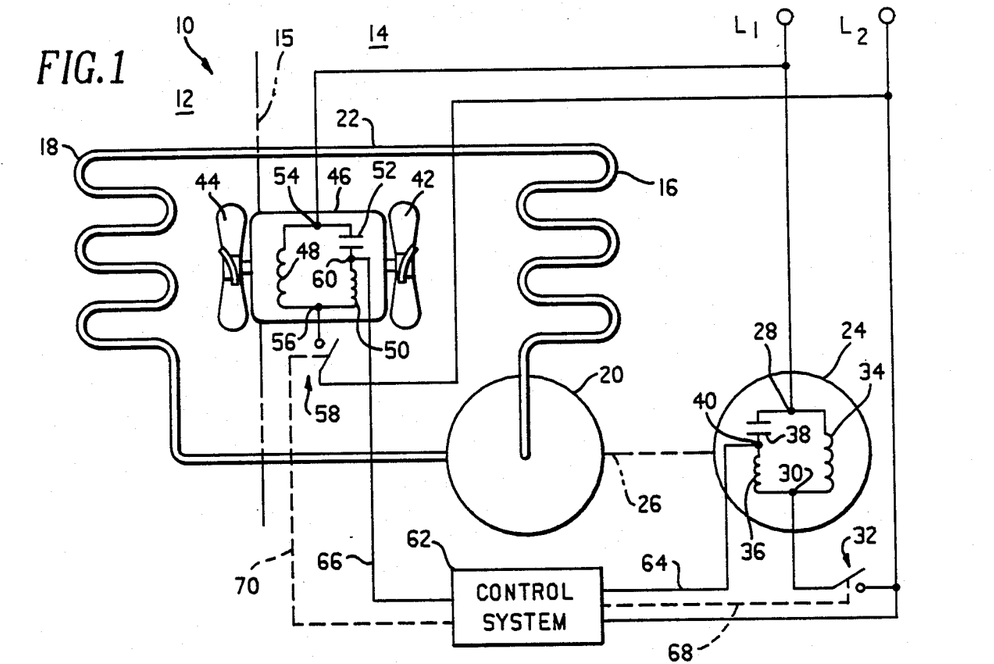
FIG. 1 is a diagrammatic view of a closed-circuit refrigeration system such as may be employed in a room air conditioner.

Referring first to FIG. 1, shown in highly schematic form is a representative closed circuit refrigeration system 10, typical of a room air conditioner. The system is divided into an indoor side 12 and an outdoor side 14 by a partition 15. The refrigeration system 10 includes an outdoor condenser 16, an indoor evaporator 18, and a refrigerant compressor 20 for circulating refrigerant through the system. Although not illustrated, it will be appreciated that the refrigeration system 10 also requires a suitable flow restricting or expansion device somewhere in the line 22 between the condenser 16 and the evaporator 18, such as a capillary tube or an expansion valve.

The refrigerant compressor 20 is driven by a single-phase AC induction motor 24 via a shaft represented at 26. In nearly all cases, the compressor 20 and the motor 24 are included within a hermetically sealed enclosure. The compressor motor 24 has a pair of AC power input terminals 28 and 30 supplied from AC power lines $L_1$ and $L_2$ via a controlled switching element 32. As schematically depicted, the motor 24 is of the type including a run winding 34 connected directly to the terminals 28 and 30, and a split phase capacitor-run winding 36 connected permanently in series with a capacitor 38 across the terminals 28 and 30.

While any suitable technique may be employed for sensing motor loading, the presently-preferred technique is to sense voltage across the capacitor-run winding 36 at a terminal 40.

Air circulation over the condenser 16 and evaporator 18 is respectively provided by a pair of fan blades 42 and 44 driven by a common fan motor 46, which is also an AC induction motor of the type having a run winding 48 and a capacitor-run winding 50 in series with a capacitor 52. The motor 46 has terminals 54 and 56 to which AC power is supplied from $L_1$ and $L_2$ via a controlled switching element 58. Voltage across the capacitor-run winding 50 is sensed at terminal 60.

The final element depicted in FIG. 1 is a control system 62. The control system 62, via lines 64 and 66, senses the voltage across the capacitor-run winding 36 of the compressor motor 24, and the voltage across the capacitor-run winding 50 of the fan motor 46, respectively. The control system 62 also controls the controlled switching elements 32 and 58 for energizing the motors 24 and 46 via respective control paths represented at 68 and 70.

In addition to the various motor protection and defrost control aspects to which the present invention is directed, it will be appreciated that the control system 62 in addition typically effects thermostatic control by cycling the entire system ON and OFF as required. For this purpose, it will be appreciated that the control system 62 also includes at least one temperature sensing element (not shown), and a means for user temperature set point adjustment.

During operation, high pressure refrigerant gas from the compressor 20 is directed into the condenser 16, and therein condensed by air circulated past the condenser 16 by the fan 42. Liquid refrigerant then flows from the condenser 16 to the evaporator 18 via the line 22, including the suitable flow-restricting expansion device (not shown). Within the evaporator 18, liquid refrigerant vaporizes to produce a cooling effect, and then returns to the compressor 20. Evaporator fan 44 circulates room air past the evaporator 18. Under some circumstances, frost builds on the evaporator 18.

Figure 2:
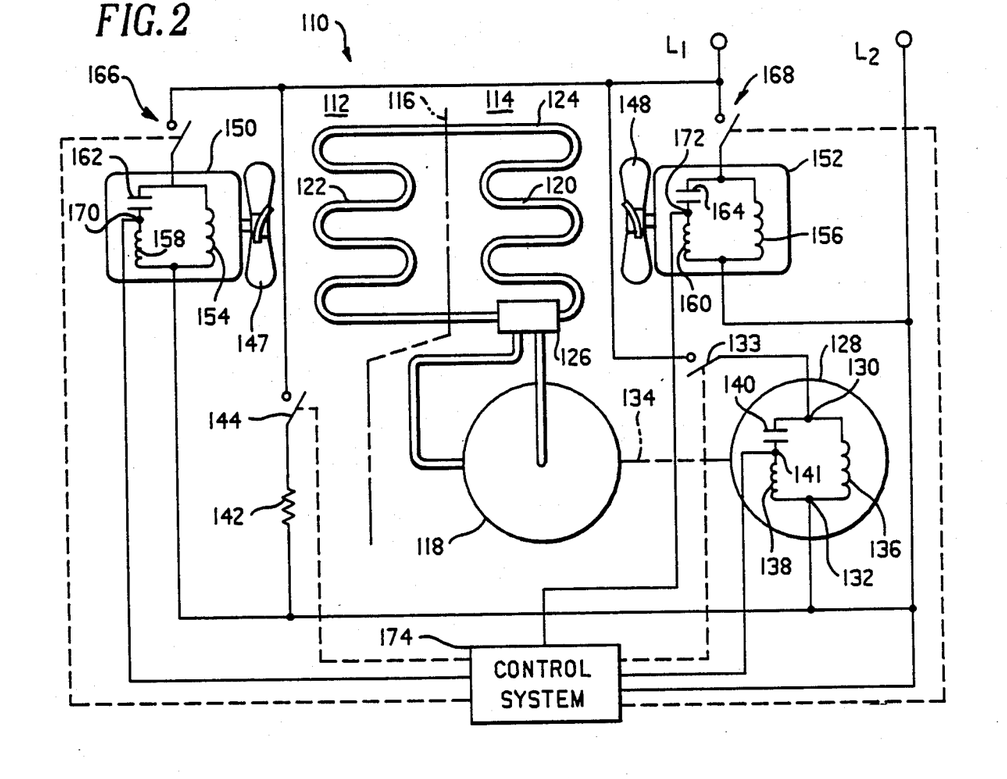
FIG. 2 is a similar diagrammatic view of a closed circuit refrigeration system employed in a reversible heat pump for effecting both heating and cooling.

With reference now to FIG. 2, depicted similarly is a reversible closed circuit refrigeration system 110 employed in a heat pump system for both heating and cooling. The system is divided into an indoor side 112 and an outdoor side 114 by a representative partition 116.

The reverse cycle refrigeration system 110 includes a refrigerant compressor 118, an outdoor heat exchanger 120, and an indoor heat exchanger 122. A suitable flow restricting device (not shown) is included within the line 124 connecting the outdoor and indoor heat exchangers 120 and 122.

The compressor 118 is connected to the heat exchangers 120 and 122 via a reversing valve 126. Thus, each of the heat exchangers 120 and 122 can function either as an evaporator or a condenser depending on whether heating mode or cooling mode operation is desired.

Within the same hermetic enclosure as the compressor 118 is an AC induction motor 128 having power input terminals 130 and 132 supplied from AC power lines $L_1$ and $L_2$ via a controlled switching element 133. The compressor 118 is driven by the motor 128 via a shaft 134. The compressor motor 128 has a run winding 136 and a capacitor-run winding 138 in series with a capacitor 140. Voltage across the capacitor-run winding 138 is sensed at a terminal 141.

One or more auxiliary electrical resistance heaters such as representative heater 142 are provided for use when outdoor ambient temperatures are too low for efficient heat pump operation, or when auxiliary heat is needed during a heat pump defrosting operation. The representative auxiliary electrical resistance heater 142 is connected to power lines $L_1$ and $L_2$ via a controlled switching element 144.

The compressor motor 128 and the auxiliary heater 142 are selectively energized from the AC line conductors $L_1$ and $L_2$ via the respective control switching elements 133 and 144.

Unlike the simpler system of FIG. 1, the heat pump system of FIG. 2 includes separate indoor 147 and outdoor 148 fans driven by respective motors 150 and 152. The motors 150 and 152 are also AC induction motors of the type having respective run windings 154 and 156, respective capacitor-run windings 158 and 160 in series with respective capacitors 162 and 164. The motors 150 and 152 are energized from AC line $L_1$ via respective controlled switching elements 166 and 168, and include terminals 170 and 172 for sensing of the voltage across the capacitor-run windings 158 and 160, respectively.

The system of FIG. 2 also includes a suitable control system 174 which senses the voltages across the capacitor-run windings 138, 158 and 160, and appropriately operates the controlled switching elements 133, 144, 166 and 168.

During operation of the system 110 of FIG. 2 for heating, the reversing valve 126 directs the flow of high temperature refrigerant gas from the compressor 118 into the indoor heat exchanger 122 which then functions as a condenser to warm the air to be conditioned, and to condense the refrigerant gas into liquid form. Indoor air is circulated over the heat exchanger 122 by the fan 147. Refrigerant flows through the line 124, including the expansion device (not shown), to the outdoor heat exchanger 120 which functions as an evaporator, and hence back through the reversing valve into the compressor 128. Outdoor air is circulated over the heat exchanger 120 via the fan 148. During heating mode operation, the outside heat exchanger 128 functioning as an evaporator is susceptible to frost build up, restricting the rate of airflow there across.

During operation of the system 110 in the cooling mode, refrigerant is directed via the reversing valve 126 in the opposite direction through the heat exchangers 120 and 122. Thus, the outdoor heat exchanger 120 functions as a condenser, and the indoor heat exchanger 122 functions as an evaporator, comparable to the operation of the system of FIG. 1.

Figure 3:
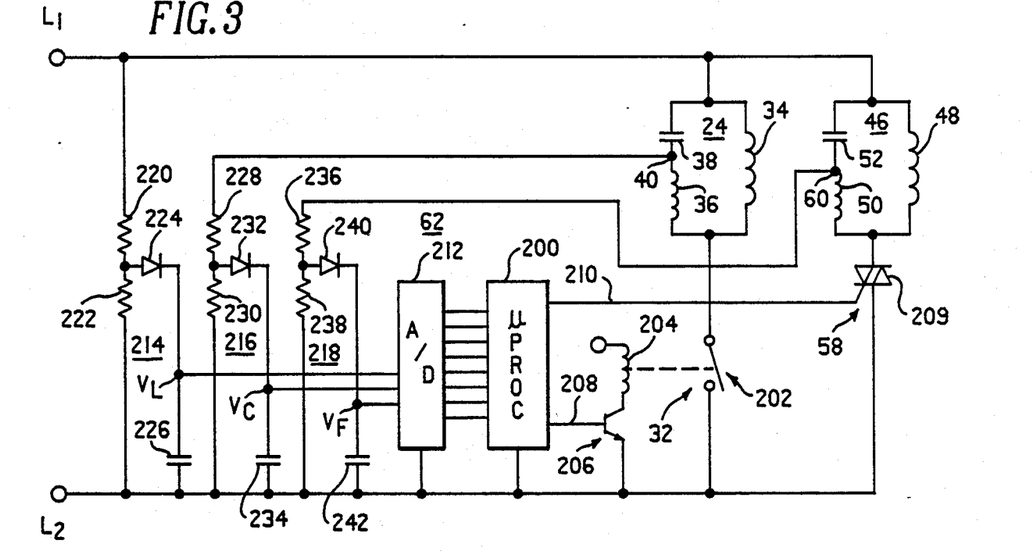
FIG. 3 is an electrical schematic diagram depicting one form of control system applied to the refrigeration system of FIG. 1.

FIG. 3 depicts a suitable control system, generally designated 62, applied to the refrigeration system of FIG. 1. The FIG. 3 control system is microprocessor-based, and thus includes a suitable microprocessor comprising a single-chip microcomputer or microcontroller 200 operating under stored program control in a manner well known to those skilled in the art. While a variety of microprocessor systems may be employed, one which is suitable is a Motorola Semiconductor Type No. M6805 Single-Chip N-Channel Microcontroller which includes, within a single integrated circuit device, program ROM, RAM, a CPU and a variety of I/0 line drivers. In FIG. 3, the controlled switching element 32 of FIG. 1 more particularly may be seen to comprise a relay having contacts 202 and a coil 204 driven by a switching transistor 206 in turn driven by an output line 208 from the microcontroller 200. Similarly, the FIG. 1 switching element 58 for the relatively lower-current fan motor 46 in FIG. 3 more particularly may be seen to comprise a triac 209 driven directly by another output line 210 of the microcontroller 200. Thus, the microcontroller 200 can selectively control both the compressor motor 24 and the fan motor 46.

For input sensing, connected to the micro-controller 200 is an input-multiplexed analog-to-digital (A/D) converter 212. For presenting inputs to the A/D converter 212, three conditioning circuits 214, 216 and 218 are included, each comprising a voltage divider for scaling sensed voltage to a lower level, a rectifier and a filter capacitor. More particularly, the conditioning circuit 214 comprises voltage divider resistors 220 and 222, diode 224 and capacitor 226; the conditioning circuit 216 comprises voltage divider resistors 228 and 230, diode 232 and capacitor 234; and the conditioning circuit 218 comprises voltage divider resistors 236 and 238, diode 240 and capacitor 242.

During operation, each of the conditioning circuits 214, 216 and 218 serves to sample with reference to $L_2$ voltage at the corresponding circuit node $L_1$, 40 or 60, rectify the voltage, and store it as a respective representative voltage sample $V_L$, $V_C$ or $V_F$ across respective capacitor 226, 234 or 242. The three voltage samples $V_L$, $V_C$ and $V_F$ are respectively for the AC line voltage, the compressor motor 24 capacitor-run winding 36 voltage, and the fan motor 46 capacitor-run winding 50 voltage.

It will be appreciated that equivalent results may be achieved by various other circuit arrangements.

The circuit time constants are such that the capacitors 226, 234 and 242 hold the DC voltage samples for a time consistent with the sampling interval of the A/D converter 212 and microcontroller 200, which is typically 100 ms. A time constant in the order of 0.5 second is typical.

Any suitable A/D converter 212 can be employed. The resolution should be at least 2% over the range of voltages expected during operation.

Figure 4:
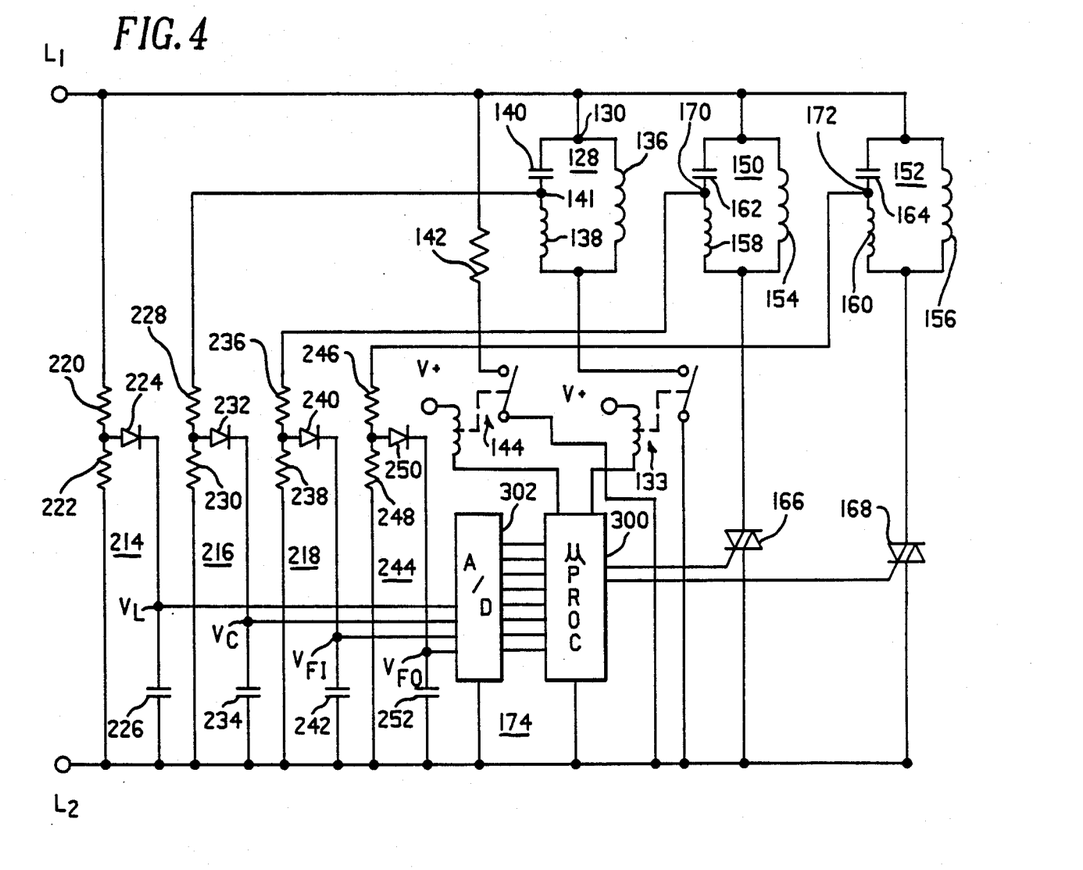
FIG. 4 is a similar electrical schematic diagram showing a control system applied to the refrigeration system of FIG. 2.

FIG. 4 is a similar electrical schematic diagram showing a single-chip microcontroller 300 and an analog-to-digital converter 302 similarly connected for operating the three motors of the FIG. 2 refrigeration system, and sensing the line voltage between $L_1$ and $L_2$, as well as the voltages across the respective capacitor-run windings 138, 158 and 160. Since an additional motor is included, in FIG. 4 there is an additional conditioning circuit 244, comprising voltage divider resistors 246 and 248, diode 250 and capacitor 252.

The conditioning circuits of FIG. 4 operate just like those of FIG. 3, except for the inclusion of an additional motor. Thus in FIG. 4 conditioning circuit 214 provides a voltage sample $V_L$ representative of AC line voltage, conditioning circuit 216 provides a voltage sample $V_C$ representative of voltage across the capacitor-run winding 138 of the compressor motor 128, conditioning circuit 218 provides a voltage sample $V_{Fi}$ representative of voltage across the capacitor-run winding 158 of the indoor fan motor 150, and conditioning circuit 244 provides a voltage sample $V_{Fo}$ representative of voltage across the capacitor-run winding 160 of the outdoor fan motor 152.

In both FIG. 3 and FIG. 4, it will be appreciated that the microcontroller 200 or 300 is thus provided with inputs which receive voltages representing the voltages across the capacitor-run windings of each of the AC induction motors in the system, is provided with an input which receives a voltage representative of voltage across the AC line terminals $L_1$ and $L_2$, and is provided with control outputs for controlling energization of the various motors.

As noted above, the microcontrollers 200 and 300 operate under stored-program control to effect the required decisions to operate the various motors. While the details of the programming will depend upon the specific microprocessors employed, it will be appreciated that the necessary programming can be represented in high-level flow chart form. Such flow charts are presented in the accompanying FIGS. 8–11, and described hereinbelow.

Figure 5:
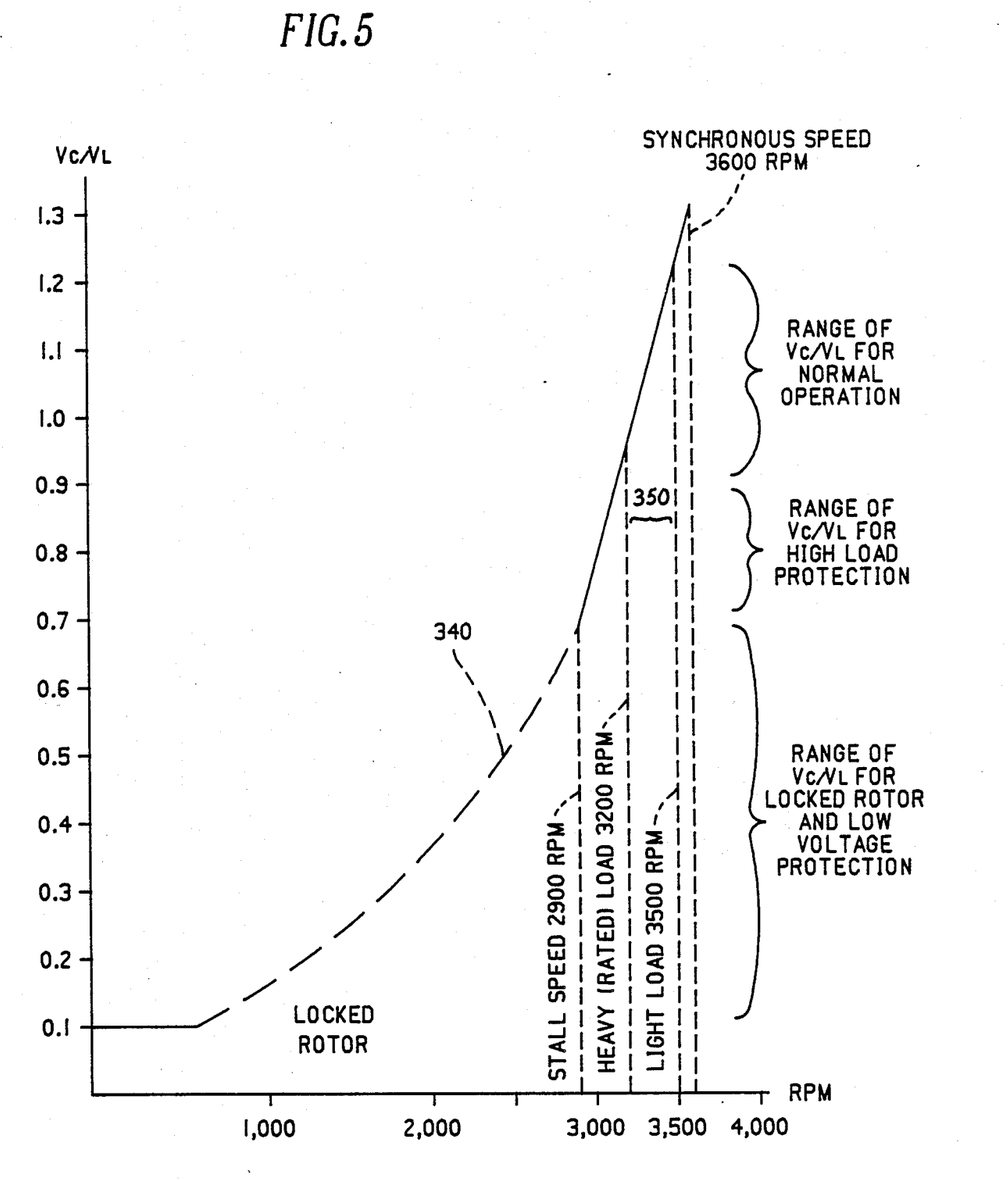
FIG. 5 is a typical plot of the ratio of capacitor-run winding voltage to line voltage as a function of compressor motor RPM.
Figure 6:
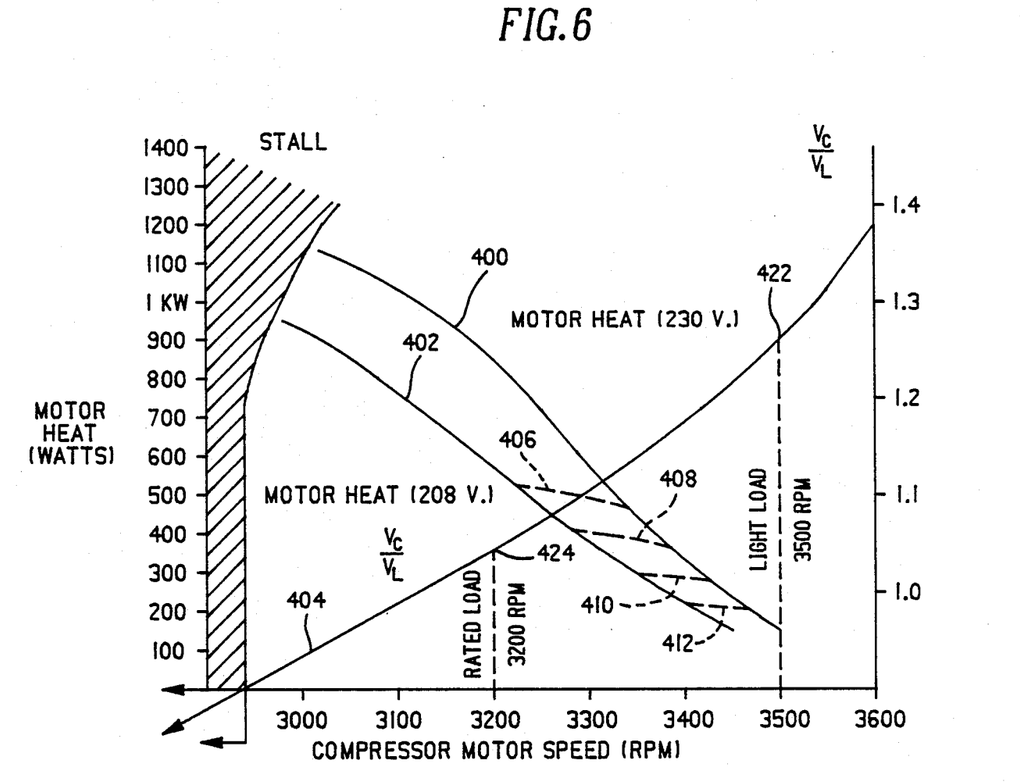
FIG. 6 is a typical plot of motor heating (lost power) as a function of motor RPM.
Figure 7:
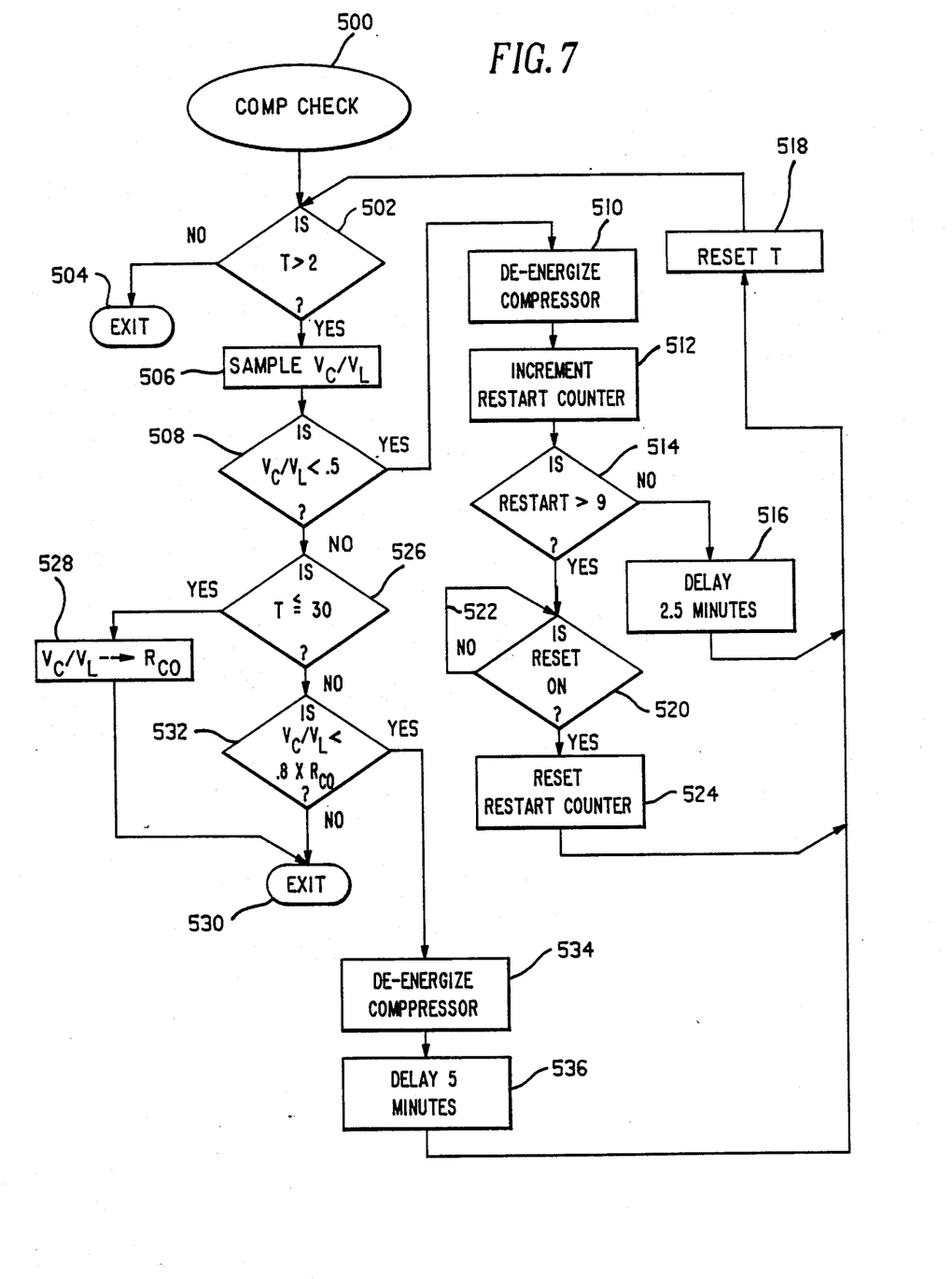
FIG. 7 is an exemplary program flow chart depicting an algorithm in accordance with the invention for compressor protection.

It is believed that the principles of the invention will be better understood in view of a brief summary of certain characteristics of single-phase AC induction motors with reference to the plots of the accompanying FIGS. 5, 6 and 7.

Referring now in particular to FIG. 5, depicted is a typical plot 340 of $V_C/V_L$ (compressor capacitor-run winding voltage $V_C$ normalized with respect to line voltage $V_L$) as a function of motor RPM for a two-pole AC induction motor having a synchronous speed of 3600 RPM. For such motors, useful motor performance is in a relatively narrow band 350 between approximately 3500 RPM (light load) and 3200 (heavy load). If the loading on the motor is increased beyond a certain level, the motor "stalls", consistently at approximately 2900 RPM. This figure applies at both high and low line voltage.

Significantly, the normalized voltage ratio $V_C/V_L$ provides a reliable and sensitive measure of motor RPM and thus motor loading for any practical range of line voltages. Moreover, as is discussed next below with reference to FIG. 6, there is a close correlation between motor heating and RPM, and between the $V_C/V_L$ ratio and RPM.

More particularly, FIG. 6 includes two typical plots 400 and 402 of motor heating (i.e. lost power) in watts as a function of motor RPM for two different power line voltages, but at an assumed constant outdoor ambient. Plot 400 is for a relatively low line voltage, 208 volts, while plot 402 is for a relatively high line voltage, 230 volts. A plot 404, comparable to the plot of FIG. 5 but in expanded form shows the shape of the $V_C/V_L$ curve (representing compressor motor loading) over the range of RPMs depicted in FIG. 6. Also shown in FIG. 6 are four constant-torque lines 406, 408, 410 and 412 which are included to illustrate what happens when a motor running steadily at a given constant torque suffers a change in line voltage.

These constant-torque lines 406, 408, 410 and 412 were experimentally obtained by measuring RPM and capacitor-run winding voltages employing a compressor calorimeter, with pre-set suction and discharge pressures, at loads which correspond to the outdoor ambient temperatures in a typical refrigeration system employed for air conditioning. Line 406 is for a pressure differential of 352 psi, simulating an outdoor ambient of 125° F.; line 408 is for a pressure differential of 310 psi, simulating an outdoor ambient of 114° F.; line 410 is for a pressure differential of 268 psi, simulating an outdoor ambient of 108° F. and line 412 is for a pressure differential of 223 psi, simulating an outdoor ambient of 95° F.

The constant-torque line 412 (95° F. outdoor ambient) corresponds to the normal rated BTU of a typical unit, and falls closely on the full load RPM rating point of the corresponding published motor curve (not illustrated). The highest load likely to be seen in service is represented by the constant-torque line 406, which is for a 125° F. outdoor ambient.

In either case, it will be seen that a lower line voltage immediately results in a lower RPM, plus a slight increase in motor heating. The worst case is clearly at high outdoor ambient temperatures, and low line voltage.

As noted hereinabove, a refrigeration system characteristic exploited by the present invention is that the development of heavy loads on the compressor motor requires a substantial period of time to develop after initial startup, typically many minutes. The reason for this is that it takes several minutes to build up the high load pressures in the system across the capillary or expansion valve. The time is a direct result of the volume of the system and the restriction afforded by the capillary or expansion valve, as the case may be.

Typically, about thirty seconds after startup, the $V_C/V_L$ ratio gently peaks, representing the end of an initial stabilization interval after which start-up transients, including liquid slugging effects and the like have dissipated, but the compressor is not yet significantly loaded by pressure build up. This peak in the $V_C/V_L$ ratio may be viewed as a condition of temporary stability where there is a relatively light load on the motor, while pressures in the system are slowly building up. From the point of view of compressor motor loading or motor speed, this condition of temporary stability allows a reference to be established.

It will be appreciated that the thirty-second figure after which the condition of temporary stability exists is an exemplary one which applies to a particular selection of different models for which it is desired to provide a "generic" control having self-calibrating capability. Accordingly, the thirty-second figure may require modification for another selection of unit models. In practice, however, the end of the stabilization interval (the beginning of the period of temporary stability) can be established non-critically within the range of five seconds to five minutes. The most important consideration is that the compressor motor has ceased to accelerate and is still lightly loaded. Another consideration is that other start-up transients have dissipated.

Compressor motor loading after an initial thirty seconds corresponds in FIG. 6 approximately to a point 422 on the motor loading line 404 where compressor motor speed is 3500 rpm. The point 422 is well to the right of the point 424 on the FIG. 6 motor loading line 404 where the compressor is operating at its rated load (heavily loaded) and motor speed is 3200 RPM.

In accordance with invention, the $V_C/V_L$ ratio existing at the time of temporary stability after an initial 30 second stabilization interval is employed as a reference ratio. Based on empirical testing a high load threshold ratio on the order of 0.75–0.8 times the reference ratio has been found to provide suitable results. The low side of this range has been found to be more suitable for use with relatively low efficiency motors with the higher side of the range more suitable for relatively high efficiency motors. Referring again to FIG. 6, the $V_C/V_L$ ratio corresponding to point 422 on the curve is 1.25. Applying a factor of 0.8 to this ratio results in a high load threshold ratio of 1.0. With this particular high load threshold ratio, the high load protection trips at a motor speed on the order of 3100 rpm. Maximum dissipated power is on the order of 800 watts under the worst case condition of low line voltage and high outdoor ambient temperature. This is a substantial improvement compared to the normal capability of a thermal overload, which has the fundamental disadvantage that the trip point under high load conditions must be compromised so that adequate locked rotor protection is obtained under low line voltage conditions.

Referring now to FIG. 7, shown is a typical program flow chart implemented in either the microcontroller 200 of FIG. 3 or the microcontroller 300 of FIG. 4 for providing compressor motor protection in accordance with the invention. At the outset, it may be noted that one of the operations called for by the FIG. 7 flow chart is the sampling of the ratio $V_C/V_L$. It will be appreciated that this operation implies separately sampling, via the A/D converter, both the capacitor-run winding voltage and the then-existing line voltage across $L_1$ and $L_2$, and performing the necessary division within the CPU of the microcontroller 200 or 300.

Figure 8:
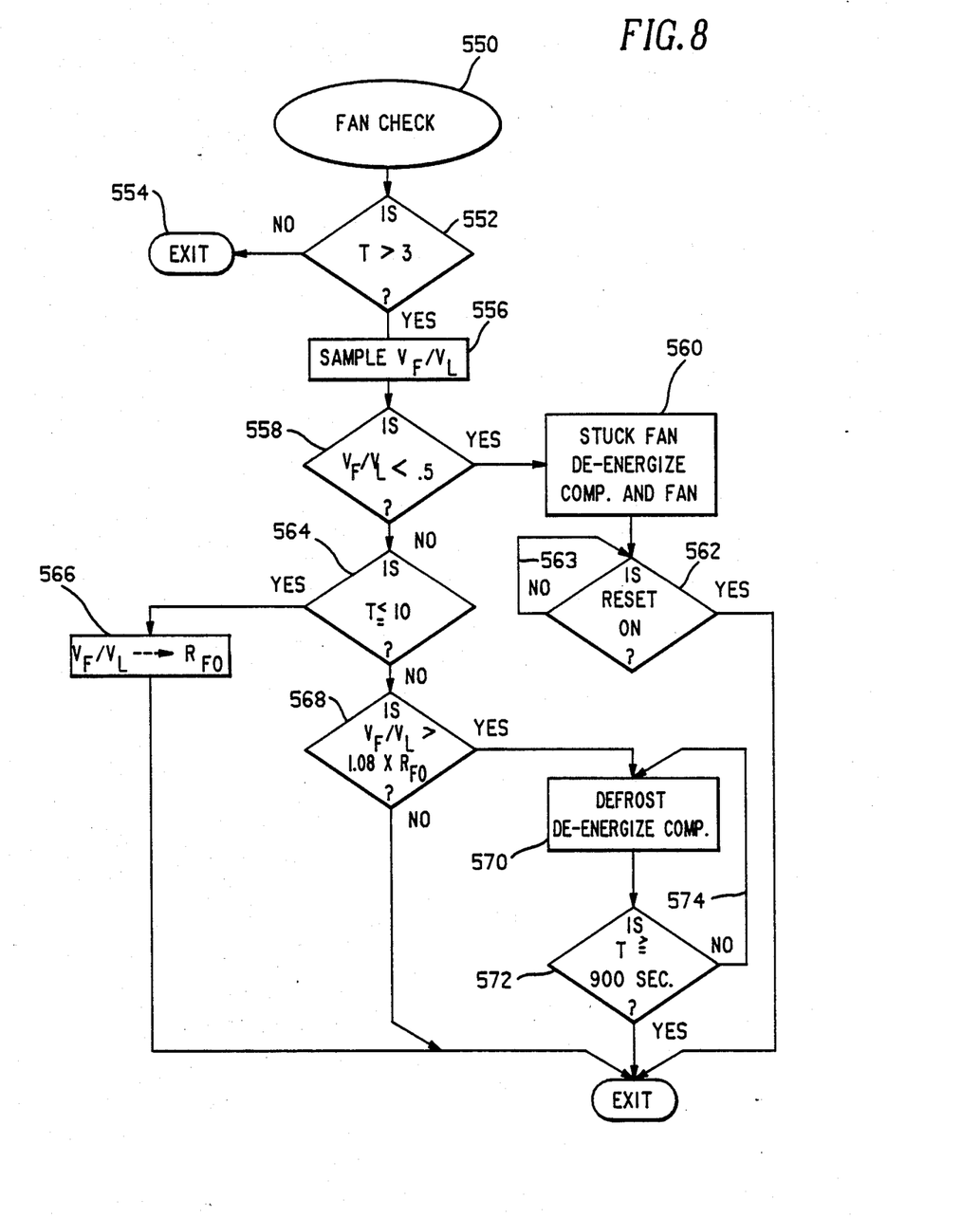
FIG. 8 is a program flow chart in accordance with the invention depicting an algorithm for controlling defrosting and for protecting the system against a blocked evaporator fan motor.
Figures 9, 10:
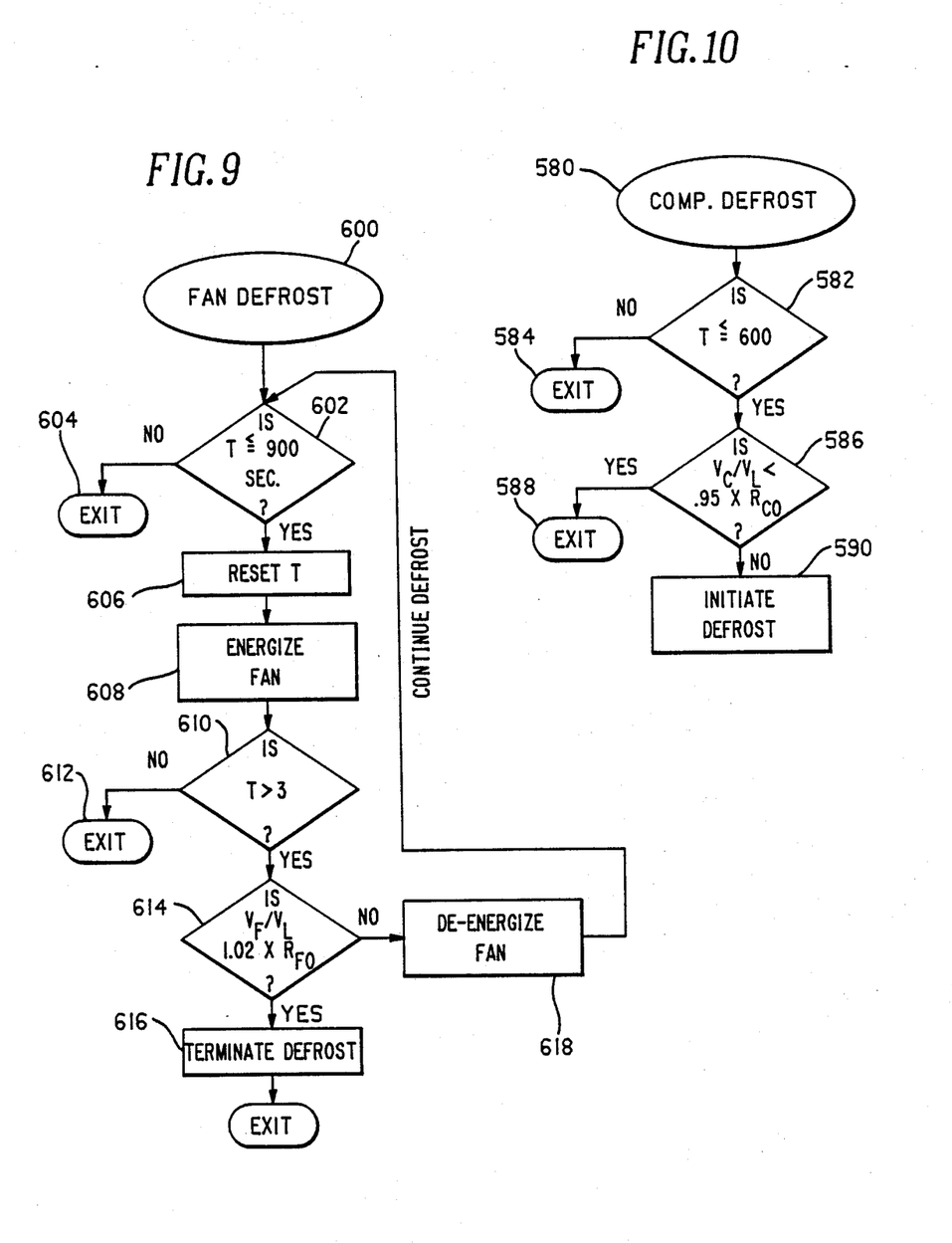
FIG. 9 is a similar flow chart, depicting the manner in which the conclusion of a defrosting operation is detected, particularly the outdoor fan of a heat pump.
FIG. 10 is a program flow chart depicting the manner in which protection is provided against the possibility that the refrigeration system is reset during a defrosting operation before the defrosting operation is concluded.

At the outset, it may be noted that the routine of FIG. 7, as well as the routines of FIGS. 8-10, is merely one part of an overall control program which continuously cycles through each of a number of subroutines, including those of FIGS. 7-10. The overall cycle may occur many times per second such that, in view of the relative slowness of the control events involved in a refrigeration system, from the point of view of each subroutine, each subroutine is essentially continuously executed from its entry point. Thus, while waiting for a particular time interval to elapse, for example, a particular routine is existed if the interval has not yet elapsed. However, the routine is re-entered perhaps only a fraction of a second later. The effect from the point of view of that particular routine is equivalent to a wait loop involving that routine alone.

For purposes of FIG. 7, $V_L$ corresponds to AC line voltage, and $V_C$ corresponds to voltage across the capacitor-run winding of the motor driving the compressor.

Considering FIG. 7 in detail, a compressor check routine begins at 500, which is entered when a compressor ON cycle has been initiated by the thermostatic control system (not shown) having called for compressor operation to effect cooling, in this example. A time variable T is assumed to be initialized to zero. In order to allow the compressor motor locked rotor interval to elapse, program flow enters a delay interval represented by a decision box 502 which exits to 504 each time through the routine until such time as the time variable T exceeds two seconds.

When the compressor motor locked rotor interval has elapsed, the answer in decision box 502 is "yes", and the $V_C/V_L$ ratio is sampled at 506. In order to ensure that the compressor motor has in fact started, the $V_C/V_L$ is tested in decision box 508 against the locked rotor ratio established, for example, as 0.5. From the discussion hereinabove with reference to FIG. 5, it will be appreciated that the locked motor ratio of 0.5 is somewhat arbitrary, inasmuch as effective protection would be provided over a relatively large range, for example a locked rotor ratio range of 0.2 to 0.7.

If a locked-rotor condition exists, then the decision in box 508 is "yes", and program flow branches to box 510 where an appropriate command is generated to de-energize the compressor by opening an appropriate relay. The boxes following box 510 implement the dual functions of establishing a compressor motor cool-down interval of approximately 2.5 minutes prior to another restart attempt, and of limiting the total number of restart attempts to nine. Rather than nine, any appropriate number for the restart attempt limit can be established. Typically, this number will be in the range of five to twenty.

Thus, in box 512 a restart counter (assumed initialized to zero) is incremented, and then, in box 514, is tested against the constant nine, which represents the maximum number of restart attempts permitted.

If the decision in box 514 is "no", indicating the maximum number of restart attempts has not been exceeded, then a 2.5 minute delay is implemented in box 516. Thereafter, the compressor is re-energized, and the time variable T is reset to zero in box 518. The program then loops back to box 502 at the beginning of another two-second compressor motor equilibrium speed interval.

If the decision in box 514 is "yes", indicating that there have been nine unsuccessful restart attempts, a loop is entered at decision box 520 which endlessly loops back via flow chart line 522 until a reset switch (not shown) is actuated. When the reset switch is actuated, the restart counter is reinitialized to zero in box 524 so that the entire sequence can be performed again, presumably by a service technician.

Returning to decision box 508, assuming the motor has started normally and thus the ratio $V_C/V_L$ is greater than the exemplary locked rotor ratio of 0.5, then the answer in decision box 508 is "no". Following a successful compressor start, a stabilization interval is allowed to elapse which, depending upon the particular system may be anywhere from five seconds to five minutes for reasons explained hereinabove with reference to FIG. 7. To implement this, execution proceeds to decision box 526 which establishes the stabilization interval, in this example thirty seconds. If the stabilization interval has not yet elapsed, then the answer in decision box 526 is "yes", and the $V_C/V_L$ ratio sampled in box 506 is stored as reference variable $R_{CO}$. During each pass through the compressor check routine 500 during the thirty-second stabilization interval, the reference variable $R_{CO}$ is thus updated. The final update occurs at T=30 and the value of $V_C/V_L$ at T=30 becomes the final value for the reference $R_{CO}$ used thereafter.

Upon subsequent passes through the compressor check routine of FIG. 7, the answer in decision box 526 is "no" because the stabilization interval is over. Program execution enters decision box 532 wherein the then-prevailing ratio $V_C/V_L$ is compared to a high load threshold ratio established as 0.8 times the reference ratio $R_{CO}$.

In the event this test fails, indicating a excessive load on the compressor motor, the answer in decision box 532 is "yes" and program flow proceeds to box 534 where the compressor is de-energized by opening the appropriate compressor relay. Box 536 establishes a five-minute compressor motor cool-down interval, followed by a reset.

In view of the discussion hereinabove of the motor characteristics, it will be appreciated that the protection technique described effectively protects against motor overloads caused by low line voltages, high outdoor ambient temperatures, and locked rotor conditions. Moreover, it will be appreciated that the protection provided is self-calibrating and generic in the sense that the same protection control system will serve, without adjustment, a wide variety of different motor sizes.

Referring now to FIG. 8, FIG. 8 is a similar flow chart depicting the manner in which a motor driving an outdoor fan of a heat pump in heating mode is protected against overheating, and also provided with automatic defrost control. It will be appreciated by those skilled in the art that the microcontroller 200 or 300 executes the flow charts of both FIG. 7 and FIG. 8 one after the other at sufficient speeds such that they may be considered to be simultaneous.

In FIG. 8, $V_L$ again corresponds to line voltage, while $V_F$ corresponds to voltage across the capacitor-run winding 160 of the motor 152 driving the outdoor fan 148.

The fan check routine of FIG. 8 is entered at 550, after the compressor motor is started. Decision box 552 establishes an equilibrium speed interval of in the order of three-seconds by exiting the routine at 554 if the run time variable T has not yet exceeded three seconds.

After the three-second equilibrium speed interval has elapsed, at 556 $V_F$ and $V_L$ are sampled, and in decision box 558 the $V_F/V_L$ ratio is tested against the fan motor lock rotor ratio which, for example, again is 0.5. If the ratio $V_F/V_L$ is less than 0.5, then the answer in decision box 558 is "yes", and the compressor is protected by shutting down the entire system in box 560. The program then remains in an endless loop comprising decision box 562 and branch 563 until such time as the reset switch (not shown) is actuated.

Returning to decision box 558, if it is determined that the fan motor has started, then decision box 564 is entered to establish an airflow stabilization interval of in the order of ten seconds. As in the case of the thirty-second stabilization interval established by decision box 526 in FIG. 7, in FIG. 8 the $V_F/V_L$ ratio sampled in box 556 is stored in box 566 as reference ratio $R_{F0}$, thus updating variable $R_{F0}$ each time through the fan check routine entered at 550. The final update occurs at T=10 seconds, and value of $R_{F0}$ at T=10 seconds establishes the reference ratio $R_{F0}$ employed thereafter.

As is discussed hereinabove, the reference ratio $R_{F0}$ corresponds to substantially maximum fan motor loading when the outdoor evaporator is free of blockage by frost.

On passes through the FIG. 8 fan check routine following the ten-second airflow stabilization interval, in decision box 568 the then-prevailing $V_F/V_L$ ratio is sampled and compared to a low-load threshold ratio established, for example, at 1.08 times the stored motor reference ratio $R_{F0}$.

If, as a result of frost blockage, load on the evaporator fan motor has decreased, the $V_F/V_L$ ratio exceeds 1.08 times the stored motor reference ratio $R_{F0}$, and the answer in decision box 568 is "yes". A defrosting operation is then initiated by entering box 570. In the particular procedure of FIG. 9, defrost is effected simply by de-energizing the compressor motor for a fixed time interval, which in this example is fifteen minutes (900 seconds) established by decision box 572 and branch 574.

It is not necessary that the test of box 568 be performed continuously (on every pass through the FIG. 8 fan check routine). It is generally sufficient to perform this test periodically every 120 seconds or so.

FIG. 9 is a flow chart of a fan defrost alogrithm which may be employed as an alternative to the fixed fifteen-minute defrost of FIG. 8 (decision box 572) where it is desired to more accurately control the termination of a defrosting operation, rather than relying upon a fixed time interval. The FIG. 9 algorithm is typically applied to the defrosting operation of the outdoor heat exchanger of a heat pump system.

In FIG. 9, the outdoor heat exchanger defrosting operation is entered at 600, with the time variable T initialized to zero at the beginning of a defrosting operation. Decision box 602 and routine exit 604 effect a delay of five minutes, for example, before further action is taken. When five minutes have elapsed, the answer in decision box 602 is "yes", the time variable T is reset to zero in box 606. The outdoor fan is then momentarily started at box 608, and allowed to come up to speed in decision box 610 which exits to 612 until a three-second interval has elapsed.

When the three-second interval has elapsed, the fan is assumed up to speed, and the answer in decision box 610 is "yes". At that point, in decision box 614, outdoor fan loading is checked to determine whether fan motor load has increased to a point where airflow is substantially normal, indicating that ice has melted.

More particularly, in decision box 614, the then-prevailing $V_F/V_L$ ratio is compared to a factor of 1.02 times the reference ratio $R_{F0}$ stored in FIG. 8, box 556. If the answer to the "less than" comparison of decision box 614 is "yes", then it is assumed that the evaporator is free of frost, and the defrosting operation is terminated at box 616.

If the answer in decision box 614 is "no", then the fan motor is de-energized in box 618, and program execution returns to box 602 to begin another five-minute defrosting interval before the fan is again momentarily started to check for frost blockage.

Referring finally to FIG. 10, depicted is another flow chart which may be employed in combination with the flow charts of FIGS. 7 and 8 to guard against the possibility that a defrosting operation is needed immediately upon compressor startup. Such could occur when a defrosting operation in progress was terminated prematurely by a momentary power interruption, or by user action.

For purposes of FIG. 10, it is assumed that the compressor motor reference ratio $R_{C0}$ has been stored as indicated by box 528 in FIG. 7.

The compressor defrost algorithm of FIG. 10 entered at 580. A compressor loading interval is established, for example ten minutes, by decision box 582 which exits to 584 until the condition is satisified. After the ten-minute compressor loading interval has elapsed, in box 586 the compressor loading is compared to a normal load threshold ratio established as 0.95 times the reference $R_{C0}$ to determine whether compressor loading has built up to an expected normal load in the absence of defrosting. If "yes", then the FIG. 10 routine exits at 588, and is not again entered until the compressor is again restarted. If the answer in decision box 586 is "no", then a defrosting operation is initiated at 590.

While specific embodiments of the invention have been illustrated and described herein, it is realized that numerous modifications and changes will occur to those skilled in the art. It is therefore to be understood that the appended claims are intended to cover all such modifications and changes which fall within the true spirit and scope of the invention.

What is claimed is:
1. A self-calibrating method for protecting a motor driving a refrigerant compressor in a refrigeration system which is cycled ON and OFF during operation, said method comprising:
determining a compressor motor reference loading at a relatively early time during a compressor ON cycle by allowing a stabilization interval to elapse during which the refrigeration system stabilizes and the compressor motor is still lightly loaded, and then sensing and storing at least a representation of compressor motor loading as the reference loading; and thereafter, during each ON cycle, at least periodically sensing at least a representation of prevailing compressor motor loading, comparing the prevailing loading to the reference loading, and de-energizing the compressor motor if the prevailing loading exceeds a high load threshold loading established as a predetermined function of the reference loading.

2. A method in accordance with claim 1, wherein the stabilization interval is within the range of five seconds to five minutes.

3. A method in accordance with claim 1, which further comprises, in the event the compressor motor has been de-energized as a result of prevailing compressor motor loading increasing above the high load threshold loading, re-energizing the motor after a cooling-off time interval has elapsed.

4. A method in accordance with claim 1, which further comprises allowing a compressor loading interval to elapse during which the compressor can be expected to become loaded in the absence of excessive evaporator frost, and then sensing compressor motor loading and initiating a precautionary defrosting operation in the event compressor motor loading is below a normal load threshold loading established as a predetermined function of the reference loading.

5. A method in accordance with claim 4, wherein the compressor loading interval is in the order of ten minutes.

6. A self-calibrating method for protecting a single-phase induction motor supplied from an AC power line, of the type including a capacitor-run winding, and driving a refrigerant compressor in a refrigeration system which is cycled ON and OFF during operation, said method comprising:

determining, as an indicator of motor loading, a compressor motor reference ratio at a relatively early time during a compressor ON cycle by allowing a stabilization interval to elapse during which the refrigeration system stabilizes and the compressor motor is still lightly loaded, then sensing the ratio of capacitor-run winding voltage to line voltage, and storing at least a representation of the sensed ratio as the compressor motor reference ratio; and thereafter, during each ON cycle, at least periodically sensing the prevailing ratio of capacitor-run winding voltage to line voltage, comparing the prevailing ratio to the compressor motor reference ratio, and de-energizing the compressor motor if the prevailing ratio is below a high-load threshold ratio established as a predetermined fraction of the reference ratio.

7. A method in accordance with claim 6, wherein the stabilization interval is within the range of five seconds to five minutes.

8. A method in accordance with claim 6, wherein the predetermined fraction by which the high-load threshold ratio is established is within the range of 0.75–0.80, times the reference ratio.

9. A method in accordance with claim 7, wherein the predetermined fraction by which the high-load threshold ratio is established is within the range of 0.75–0.80 times the reference ratio.

10. A method in accordance with claim 6, which further comprises, in the event the motor has been de-energized as a result of the prevailing ratio of capacitor-run winding voltage to line voltage falling below the high-load threshold ratio, re-energizing the motor after a cooling-off time interval has elapsed.

11. A method in accordance with claim 6, which further comprises allowing a compressor loading interval to elapse during which the compressor can be expected to become loaded in the absence of excessive evaporator frost, then sensing the prevailing ratio of compressor capacitor-run winding voltage to line voltage and initiating a precautionary defrosting operation in the event the sensed ratio is above a normal load threshold ratio established as a predetermined fraction of the reference ratio.

12. A method in accordance with claim 11, wherein the compressor loading interval is in the order of ten minutes.

13. A method in accordance with claim 11, wherein the predetermined fraction by which the normal load threshold ratio is established is approximately 0.95 of the reference ratio.

14. A method in accordance with claim 12, wherein the predetermined fraction by which the normal load threshold ratio is established is approximately 0.95 of the reference ratio.

15. A self-calibrating method in accordance with claim 14, which further comprises determining whether the compressor motor has failed to start at the beginning of an ON cycle by:

allowing a compressor motor equilibrium speed interval to elapse; and then sensing the prevailing ratio of capacitor-run winding voltage to line voltage, and de-energizing the compressor motor if the prevailing ratio is below a predetermined locked rotor ratio.

16. A method in accordance with claim 15, wherein the predetermined locked rotor ratio is in the order of 0.5.

17. A method in accordance with claim 16, wherein the compressor motor equilibrium speed interval is approximately two seconds.

18. A method in accordance with claim 15, which further comprises allowing the compressor motor to attempt a restart after a cool-down interval.

19. A method in accordance with claim 17, wherein the cool-down interval is approximately 2.5 minutes.

20. A method in accordance with claim 17, which comprises limiting the number of restart attempts.

21. A self-calibrating control system for a refrigeration system including a refrigerant compressor and a compressor motor for driving the compressor, said control system comprising:

a switching element for cycling the refrigeration system ON and OFF by energizing and de-energizing the compressor motor;

a sensing element for sensing at least a representation of compressor motor loading;

means connected to said sensing element for determining a compressor motor reference loading at a relatively early time during a compressor ON cycle by allowing a stabilization interval to elapse during which the refrigeration system stabilizes and the compressor motor is still lightly loaded, and then storing at least a representation of motor loading as the reference; and means connected to said sensing and switching elements for thereafter, during each ON cycle, at least periodically comparing at least a representation of prevailing compressor motor loading to the reference loading, and de-energizing the compressor motor if the prevailing loading exceeds a high load threshold loading established as a predetermined function of the reference loading.

22. A control system in accordance with claim 21, wherein the stabilization interval is within the range of five seconds to five minutes.

23. A control system in accordance with claim 21, which further comprises means for re-energizing the motor after a cooling-off time interval has elapsed in the event the compressor motor has been de-energized as a result of prevailing loading exceeding the high load threshold loading.

24. A control system in accordance with claim 21, which further comprises means for allowing a compressor loading interval to elapse during which the compressor can be expected to become loaded in the absence of excessive evaporator frost, and then initiating a precautionary defrosting operation in the event the prevailing compressor motor loading is below a normal load threshold loading established as a predetermined function of the reference loading.

25. A control system in accordance with claim 24, wherein the compressor loading interval is in the order of ten minutes.

26. A self-calibrating control system for a refrigeration system including a refrigerant compressor and a compressor motor for driving the compressor, the compressor motor being an AC induction motor of the type including a capacitor-run winding and supplied from an AC power line, said control system comprising:

a switching element for cycling the refrigeration system ON and OFF by energizing and de-energizing the compressor motor;

sensing means for sensing the ratio of capacitor-run winding voltage to AC line voltage;

means connected to said sensing means for determining, as an indicator of motor loading, a compressor motor reference ratio at a relatively early time during a compressor ON cycle by allowing a stabilization interval to elapse during which the refrigeration system stabilizes and the compressor motor is still lightly loaded, and then storing at least a representation of the ratio of capacitor-run winding voltage to line voltage as the compressor motor reference ratio; and means connected to said sensing means and said switching element for thereafter, during each ON cycle, at least periodically comparing the prevailing ratio of capacitor-run winding voltage to line voltage to the reference ratio, and de-energizing the compressor motor if the prevailing ratio is below a high-load threshold ratio established as a predetermined fraction of the reference ratio.

27. A control system in accordance with claim 26, wherein the stabilization interval is within the range of five seconds to five minutes.

28. A control system in accordance with claim 26, wherein the predetermined fraction by which the high-load threshold ratio is established is on the order of 0.75–0.80 times the reference ratio.

29. A control system in accordance with claim 27, wherein the predetermined fraction by which the high-load threshold ratio is established is on the order of 0.75–0.80 times the reference ratio.

30. A control system in accordance with claim 26, which further comprises means for re-energizing the motor after a cooling-off time interval has elapsed in the event the motor has been de-energized as a result of the prevailing ratio falling below the high-load threshold.

31. A control system in accordance with claim 26, which further comprises means for allowing a compressor loading interval to elapse during which the compressor can be expected to become loaded in the absence of excessive evaporator frost, and then initiating a precautionary defrosting operation in the event the prevailing ratio of compressor capacitor-run winding voltage to line voltage is above a normal load threshold ratio established as a predetermined fraction of the reference ratio.

32. A control system in accordance with claim 30, wherein the compressor loading interval is in the order of ten minutes.

33. A control system in accordance with claim 30, wherein the predetermined fraction by which the normal load threshold ratio is established is approximately 0.95 of the reference ratio.

34. A control system in accordance with claim 32, wherein the predetermined fraction by which the normal load threshold ratio is established is approximately 0.95 of the reference ratio.

35. A self-calibrating control system in accordance with claim 34, which further comprises means for determining whether the compressor motor has failed to start at the beginning of an ON cycle by:

allowing a compressor motor equilibrium speed interval to elapse; and de-energizing the compressor motor if the prevailing ratio of capacitor-run winding voltage to line voltage is below a predetermined locked rotor ratio.

36. A control system in accordance with claim 35, wherein the predetermined locked rotor ratio is in the order of 0.5.

37. A control system in accordance with claim 36, wherein the compressor motor equilibrium speed interval is approximately two seconds.

38. A control system in accordance with claim 35, which further comprises allowing the compressor motor to attempt a restart after a cool-down interval.

39. A control system in accordance with claim 37, wherein the cool-down interval is approximately 2.5 minutes.

40. A control system in accordance with claim 37, which comprises means for limiting the number of restart attempts.

* * * * *